United States Patent [19]

Smith

[11] Patent Number: 4,576,552
[45] Date of Patent: Mar. 18, 1986

[54] AIR AND WATER VOLUME CONTROL APPARATUS FOR HYDROPNEUMATIC TANKS

[76] Inventor: Dresden G. Smith, 1621 English Dr., San Jose, Calif. 95129

[21] Appl. No.: 730,438

[22] Filed: May 6, 1985

[51] Int. Cl.$^4$ .............................................. F04B 41/06
[52] U.S. Cl. ...................................... 417/2; 137/209; 417/32; 417/36; 417/38
[58] Field of Search ................ 137/206, 209; 417/2-5, 417/32, 36, 38

[56] References Cited

U.S. PATENT DOCUMENTS

| | | | |
|---|---|---|---|
| 1,628,265 | 5/1927 | Muffly | 137/209 |
| 2,940,395 | 6/1960 | Hill | 417/32 |
| 3,136,871 | 6/1964 | Barletta | 417/36 |
| 3,540,027 | 11/1970 | Rauth et al. | 417/36 |
| 3,929,399 | 12/1975 | Aronson | 137/209 |
| 4,248,053 | 2/1981 | Sisk | 417/32 |
| 4,371,315 | 2/1983 | Shikasho | 417/32 |
| 4,444,545 | 4/1984 | Sanders et al. | 417/36 |

Primary Examiner—Martin P. Schwadron
Assistant Examiner—Sheri M. Novack
Attorney, Agent, or Firm—Gerald L. Moore

[57] ABSTRACT

A hydropneumatic tank control for a water supply system having a closed water tank (10), an air compressor (17) and a water pump (21, 22). A plurality of pressure switches (PS18, PS23, PS25, PS26) at the air compressor detect air pressure threshholds in the tank and a plurality of water level detector electrodes (32, 33, 34, 35) detect water level threshholds in the tank. A control causes the water pump to fill the tank to a pressure level or a water level at the operator's option. A pressure switch (PS2) in a tank adapter assembly (20) shuts down the system if an over pressure condition is detected. The compressor is housed in a waterproof housing (41) and cooled by a blower (48) passing air through the housing with thermostats (TH14, TH15, TH16) functioning to protect the compressor from overheating. A baffle 52 prevents the cooling air from recirculating through the housing.

6 Claims, 4 Drawing Figures

AIR AND WATER VOLUME CONTROL APPARATUS FOR HYDROPNEUMATIC TANKS

FIELD OF THE INVENTION

A control and apparatus for regulating the interrelated air pressure, air volume and water volume in a hydropneumatic tank.

BACKGROUND OF THE INVENTION

A hydropneumatic tank is a ground mounted pressure vessel which is used to store water for delivery under pressure to a water system without the necessity of using an elevated tank to develop the necessary system pressure. These tanks operate by using compressed air to force the stored water into the distribution line. As water exits the tank, the tank pressure drops, and after a preset quantity of water has exited the tank, more water is pumped into it.

It is necessary to control the level of water in a hydropneumatic tank. Usually, it is desired to maintain a minimum of 10 to 40 percent of the tank volume filled with water, but the actual amount depends upon the particular system with which the tank is connected and the use made of the water. Obviously, maintaining the water level is important because equipment receiving water from the system could be damaged if no water is received or if pressured air gets into the water system lines.

Control of such a system is compounded by the fact that usually the hydropneumatic tanks and controls are located in remote areas, preferably close to the water supply, and are not closely supervised. Such systems frequently also are located in unsheltered areas open to the rain and hot sunshine, thereby establishing a very difficult environment in which to operate. Additionally, certain malfunctions can occur which if not guarded against, can result in overpressurizing of the tank causing a very dangerous condition.

It is the purpose of this invention to provide an improved control and apparatus for maintaining the air-water volume in a hydropneumatic tank.

DESCRIPTION OF THE INVENTION

Figure 1:
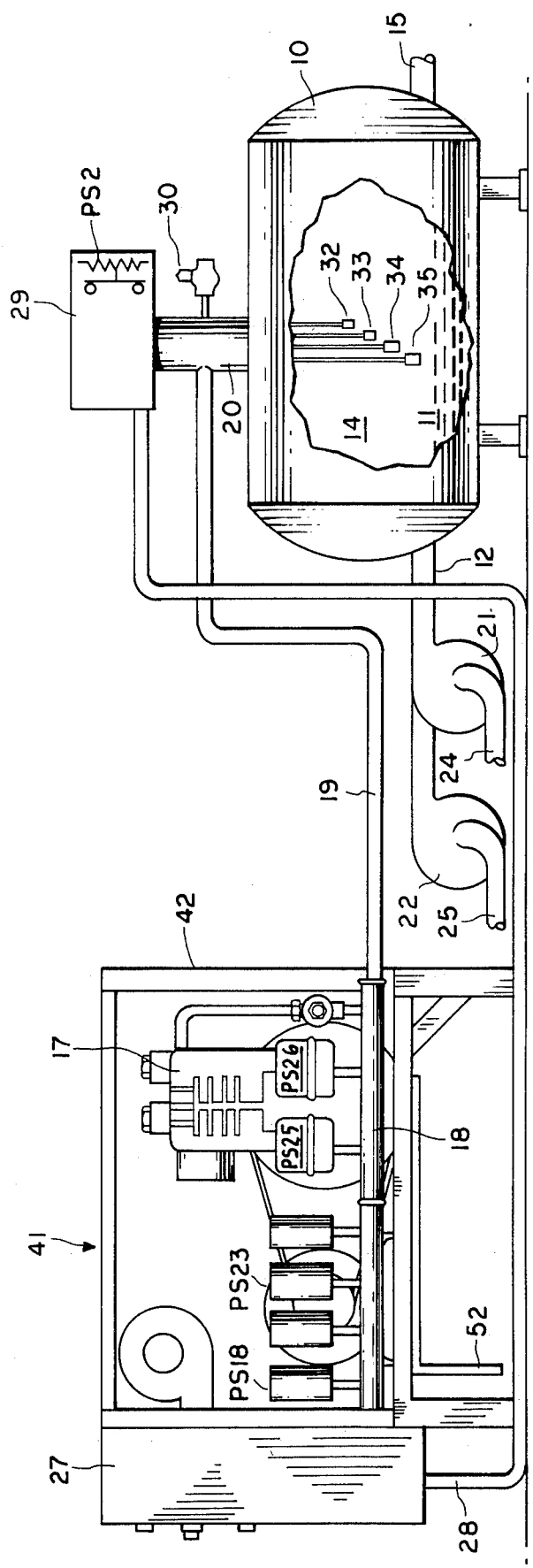
FIG. 1 is a side view of a hydropneumatic tank system embodying the present invention.

The invention is embodied in a water system such as that shown in FIG. 1, for controlling the air and water volume in a tank 10. By pressurizing the air volume 14 above the water, the water can be caused to flow under pressure through an outlet 15 in the same manner as if the tank were elevated. To supply pressured air to the tank, a compressor 17 pumps air into a manifold 18 connected by a pipe 19 to an adapter assembly 20 on the top of the tank 10. Water is pumped to the tank through the inlet 12 by pumps 21 and 22 from a source (not shown) through the pipes 24 and 25. It is the control of the compressor 17 and the pumps 21 and 22 that maintains the air-water volume in the tank 10.

The control system is generally embodied in the control housing 27 which is connected by a conduit 28 to the tank mounted housing 29. The system can be set to stop the pumps 21 and 22 at a preset water level or at a preset pressure in the tank. Provision is made to prevent both pumps from starting at one time by delaying the start of the lag pump until after the lead pump has started. This can prevent overloading the electrical circuit providing power to the pumps. Additionally, the pumps can only be restarted after a preset time delay. Such a delay protects the pumps in the event the electric power goes on and off rapidly. The control system also operates the air compressor 17 when it is required to inject air into the tank 10 to increase the air charge. If the air charge becomes excessive for any reason, the control operates a vent air valve 30 to release air from the tank. The water levels in the tank are detected by the sensors 32, 33, 34 and 35 while the pressure in the system is detected by the pressure sensors PS18, PS23, PS25 and PS26 (FIG. 1).

Figure 2A:
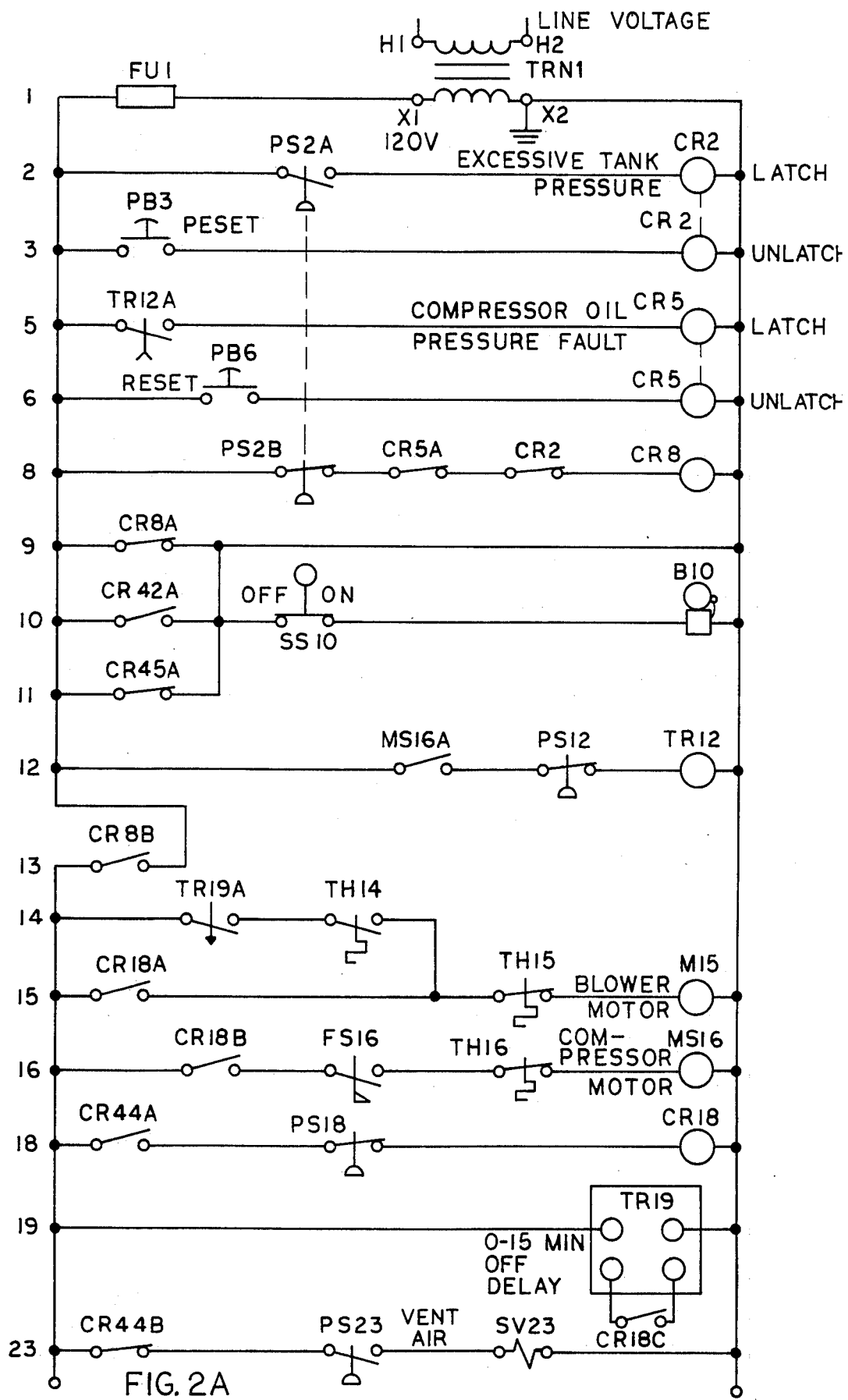
FIGS. 2A and 2B are a circuit diagram of a control embodying the present invention.
Figure 2B:
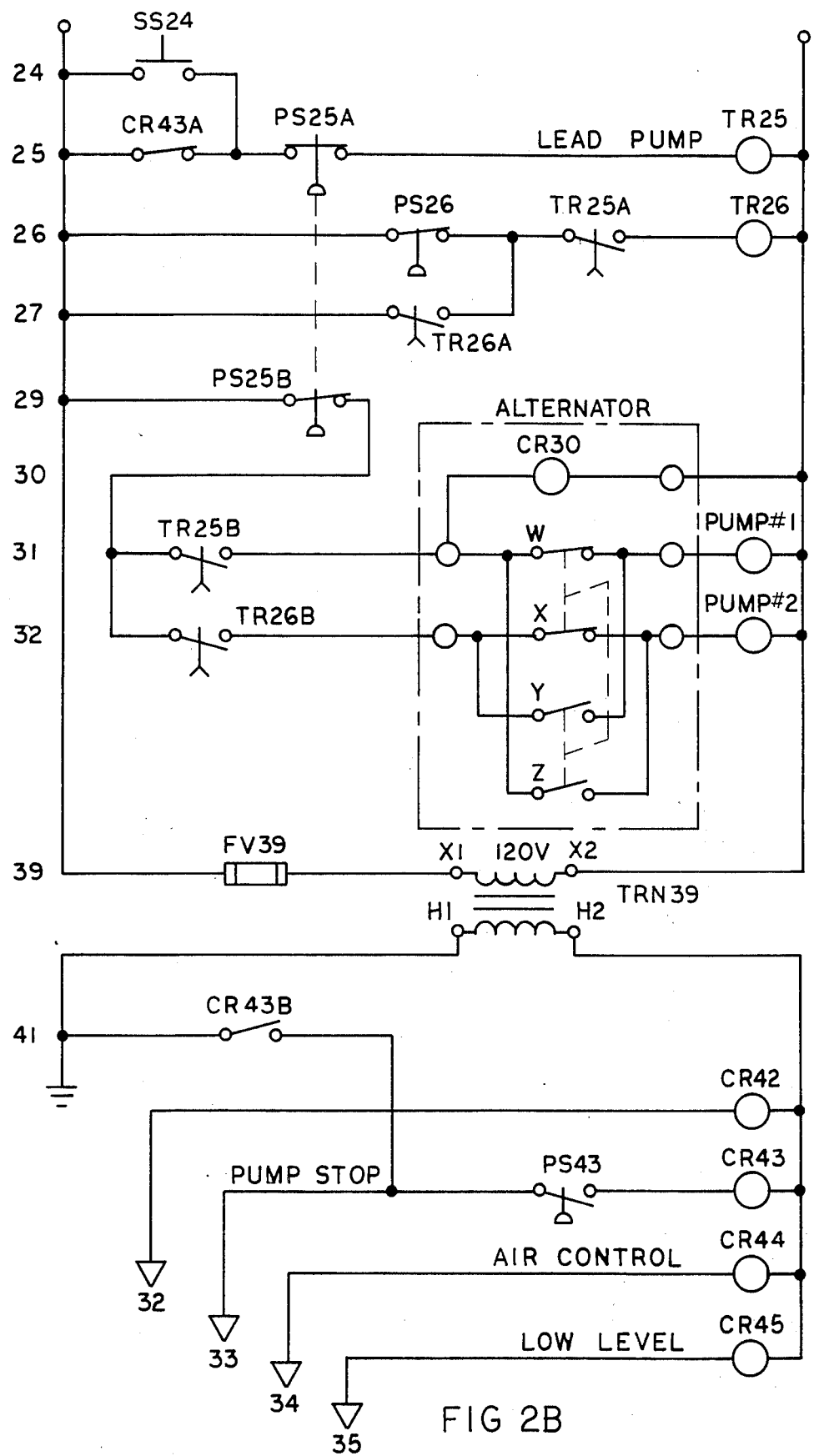

The circuit diagram of FIG. 2 shows the control for this sytem. The following is a description of the lines of that ladder diagram.

Line 1: The transformer TRN1 converts the line voltage to 120 volts for the control system and is protected by the fuse FU1.

Line 2: The pressure switch PS2 is located in the tank mounted assembly and senses the tank pressure directly. This switch will sense excess pressure in the tank 10. The control relay CR2 is a latching relay which is activated by the pressure switch contacts PS2A to shut down the entire control system.

Line 3: The push button PB3 is located on the control panel 27 and allows manual reset of the control relay CR2.

Line 5: The contacts TR12A of a time delay relay TR12 (line 12) energize a latching relay CR5. This latching relay latches-open to a low oil pressure reading by the pressure switch PS12, line 12, and locks out the entire system if the air compressor oil system fails.

Line 6: A push button PB6 on the control panel allows reset of the latching relay CR5.

Line 8: The contacts CR5A of relay CR5 must be closed to allow the control system to operate. A pressure switch PS2 is located in the tank adapter assembly 20 and includes normally closed contacts PS2B. Line 8 cannot energize unless this pressure switch is wired into the system and these contacts are closed. Excessive tank pressure will also open the contacts CR2A through actuation the relay CR2 (line 2) to deactivate the system.

Line 9: Contacts CR8A will close to energize an alarm bell B10 if control relay CR8 is de-energized.

Line 10: Contacts CR42A will energize the alarm bell if the water level in the tank becomes alarmingly high as detected by sensor 32 (line 42). A selector switch SS10 allows the operator to disable the bell.

Line 11: Contacts CR45A energizes the alarm bell B10 if the water level in the tank becomes excessively low as detected by the sensor 35.

Line 12: Pressure switch PS12 opens when the air compressor oil pressure exceeds a preset value. The relay TR12 is a delay type relay to allow the oil pressure to build up before the compressor oil pressure fault circuit is activated. If the pressure switch PS12 fails to open because of low oil pressure, relay TR12 is energized allowing contacts TR12A (line 5) to close indicating an oil pressure fault and stopping the compressor.

Line 13: Contacts CR8B lock out the air compressor 17 and the water pumps by deenergizing the remainder f the circuit if a fault deenergizes the control relay CR8 (line 8).

Line 14: Contacts TR19A operated by the time delay relay TR19 (line 19) keeps the blower operating after the compressor motor stops in order to cool down the compressor. A thermostat TH14 disables the contacts CR19A if the ambient temperature is sufficiently low that continued cooling of the compressor is not necessary. The thermostats measuring temperatures around the compressor are located in the ventilation air duct 50 shown in FIG. 3) so as to detect the hottest air exiting the compressor housing.

Figure 3:
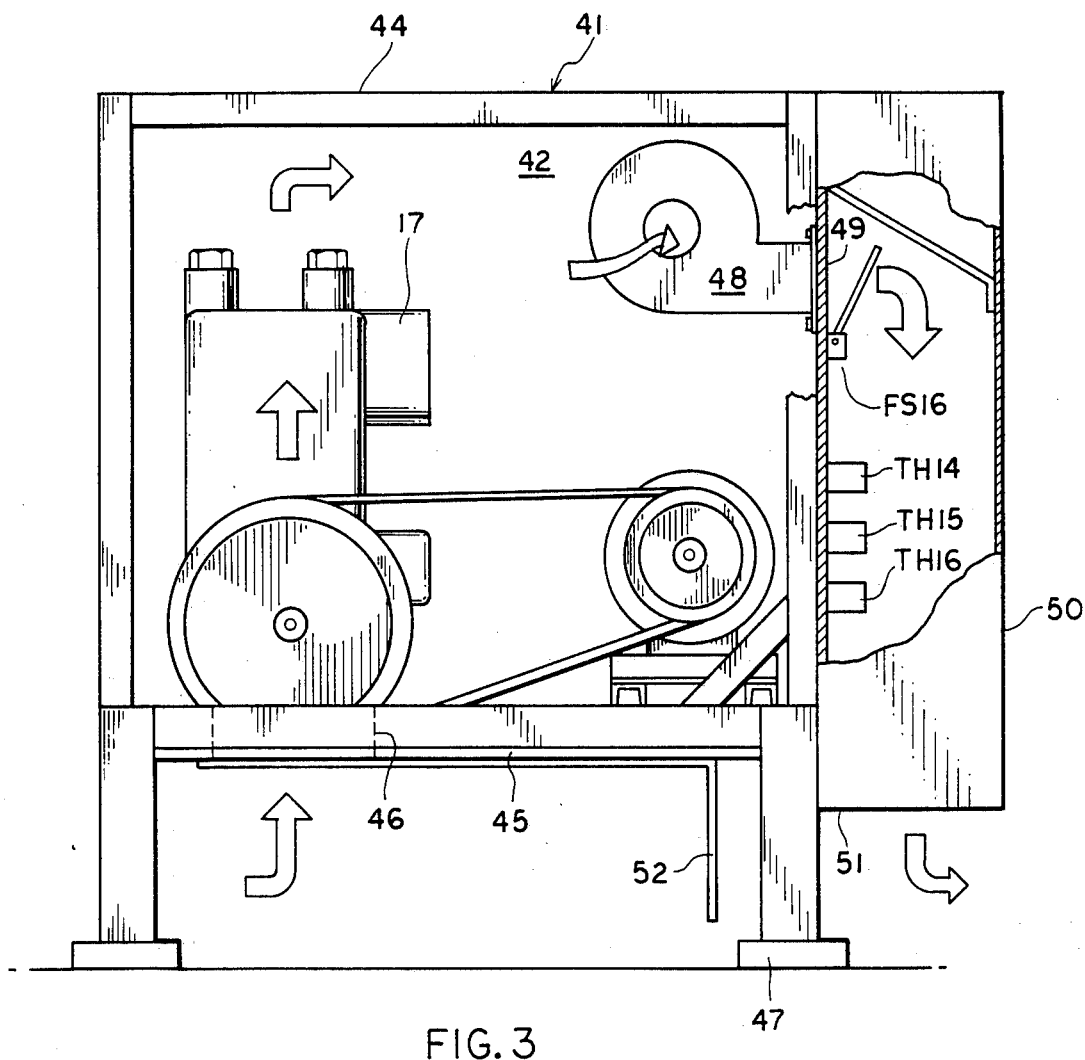
FIG. 3 is a cross-sectional view of the enclosure for the compressor showing the cooling air flow.

Line 15: Contacts CR18A causes the blower motor to run when the air compressor receives a signal to start. A thermostat TH15 prevents the blower from operating if the ambient temperature is sufficiently high that the blower would be damaged if operated. The thermostats TH14 and TH15 are located in the ventilation air duct 50 of the compressor housing (FIG. 3).

Line 16: This line supplies power to the compressor when the compressor is required to pump air into the tank 10. The contacts CR18B are closed by a pressure switch PS18 detecting a low tank pressure. A flow switch FS16 is located in the cooling air exit duct (FIG. ) and prevents the compressor from operating unless the cooling blower is operating first. A thermostat TH16 detects ambient temperature and prevents operation of the compressor if the ambient temperature is sufficiently high to cause harm to the compressor if operated. If manual operation of the compressor is desired, these switches can be shunted by a circuit (not shown).

Line 18: Contacts CR44A close to run the air compressor when the water level in the tank contacts the electrode 34 indicating an intermediate water level and pressure switch PS18 (located on the manifold 18) is operated by the tank pressure to energize the relay CR18 and close the contacts CR18B (line 16).

Line 19: This time delay relay TR19 actuates immediately when a signal is received to add air to the tank but deactuates slowly to allow the blower to continue to run for a period after the air compressor ceases to run. The contacts CR18C are operated by relay CR18 in line 3.

Line 23: This line allows excess air to be vented from the tank 10 if necessary. The contacts CR44B are closed unless electrode 34 is contacted by water. The pressure switch PS23 is located on the manifold assembly and senses tank pressure and remains open unless the pressure exceeds a predetermined value. The solenoid valve V23 is located in the tank mounted assembly 20 and vents air from the tank when activated by the closing of the contacts PS23.

The following lines 24 through 36 contain elements which control the water pumps.

Line 24: The selector switch SS24 can be closed to shunt the electrode circuit and allow the pressure switch PS25 to control the start of the lead pump.

Line 25: There are two modes of pump operation. The two modes are (1) the pumps both start by separate pressure settings, and both stop at the same time when water contacts electrode 33, or (2) the pumps both start by separate pressure settings, and both stop at the same time when the pressure switch PS25 for the lead pump opens on rising pressure. The selector switch SS24 disables the electrode circuit to allow pressure switch PS25 to control the start of the lead pump and the stop of both pumps. Note that the lag pump will not run unless the tank pressure continues to fall after the lead pump starts. If the control mode is changed from "pumps stop on level" to "pumps stop on pressure" the setting of pressure switch PS25 must be lowered so that it opens at the desired stop pressure. When the pumps stop on level, switch PS25 serves as a safety back-up control and is set to open a little higher than the desired stop pressure; otherwise switch PS25 stops the pumps instead of the electrode circuit. The contacts CR43A are closed when water in the tank has not contacted the electrode 33. The pressure switch contacts PS25A are on the supply line circuit for the time delay relay TR25 along with the contacts CR43A. The pressure switch PS25 is located on the manifold 18 and senses tank pressure. In the "pumps stop on level" mode, pressure switch PS25 is always closed unless the tank pressure rises above the optimum value. In the "pumps stop on pressure" mode, pressure switch PS25 starts and stops the lead pump so it closes when the lead pump needs to start and opens to stop the lead pump, it also stops the lag pump if it is running at the time (most of the time, only the lead pump runs).

Line 26: A pressure switch PS26 is a small differential switch located in the manifold and controls the start of the lag pump. Once the lag pump has started, it is forced to run until the lead pump stops because the pressure switch PS26 is shunted by the contacts of TR26 until the relay TR25 deactivates. The contacts TR25A allow the pressure switch 26 to energize the relay TR26 after the relay TR25 has timed out and this prevents both pumps from starting at the same time.

Line 27: The contacts TR26A of the time delay relay TR26 delays the start of the lag pump 10 seconds.

Line 29: The contacts PS25B prevent both pumps from running by cutting power to the pumps when the switch PS25 senses a tank pressure indicating the pumps should stop. This is a safety feature.

Line 31: The contacts TR25B, index the alternator 31A and supply power to the lead pump selected. The alternator alternates the lead pump function between pump no. 1 and pump no. 2.

Line 32: Functions as does line 31 except for the lag pump no. 2.

Line 39: The transformer TRN39 provides power for the electrode circuit.

Line 41: The contacts CR43A serve to shunt the electrode 33 to cause the control relay 43 to remain energized even though the water level falls below the electrode 3 level and pressure switch PS432 allows the pump to stop when pressure switch PS432 opens.

Lines 42–45: The electrodes 32, 33, 34 and 35 all form return paths from the water in the tank to one side of the supply line. The electrode 32 is used to generate the "high water level" signal and energize the associated control relay CR42. The electrode 33 and control relay CR43 controls the levels at which the pumps are de-energized and stopped. The electrode 34 allows the compressor to be energized when the level is at or above that level. The pressure switch PS43 is used to unlatch the control relay CR43 to restart the lead pump when the pressure has fallen to the "start" set point or low level value indicating that water needs to be pumped into the tank.

Thus from the description above, it is clear that the compressor MS16 will only operate when the ambient temperature is sufficiently low that such operation will not cause damage. Additionally, the cooling blower will operate after the compressor is turned off if the temperature is sufficiently high. All the components shown in the electrical schematic drawing (FIG. 2) and not shown in FIGS. 1 and 3, are located in the control housing 27 unless otherwise stated.

As shown in FIG. 3, the compressor is located in a housing 41 comprising solid side panels 42, a solid top panel 44 and a bottom baffle 45 with an opening 46 therein for the entry of cooling air. The housing is supported on legs 47 to allow air to circulate below the bottom baffle. A blower 48 draws in cooling air through the opening 46 and pushes air out of the opening 49 into a vertical duct 50 having a bottom opening 51 and a closed top. This cooling air is prevented by a baffle 52 from flowing back into the inlet 46. Rain and moisture are prevented from entering the enclosure since the top and side panels are all solid.

Thus as described, the control described allows control of the water pumps by either of two methods. The first method is the "pumps stop on pressure" method which uses the pressure switch PS25 located on the manifold 18 next to the air compressor 17 to sense the pressure of the tank 10 and switch the pump on at a predetermined low pressure and off at a predetermined high pressure. The control is set to operate in this mode by closing the selector switch SS24 which disables the electrode circuit of electrode 33. PS25 is adjusted to open at the pressure at which the pumps are desired to stop, and is adjusted to close at the pressure at which the lead pump is desired to start.

The second method by which the water pumps 21 and 22 are controlled is the "pump stop on level" method. This method starts the pumps at a low air pressure indication and stops them at a high water level indication in the tank. This is accomplished by switching the pumps on with the pressure switch PS43 and switching them off when water contacts the electrode 33. In this mode the pressure switch PS25 serves as a safety back-up switch. The control is set to operate in this mode by opening the selector switch SS24 to engage the electrode circuit of electrode 33 and adjusting PS25 to open at a pressure slightly higher than the pressure at which the pumps are desired to stop. The differential of PS25 is set at the minimum limit so that it will always be in the closed condition before the pumps are started by PS43. In this mode, PS25 will only open and stop the pumps if there is too much air in the tank and the preset stop pressure is exceeded before the water contacts electrode 33. PS25 serves as a safety back up switch for the electrode circuit.

I claim:

1. A hydropneumatic tank control for a water supply system having a closed water tank with a water inlet and outlet, an air compressor to supply pressurized air through a manifold and into said tank and a water pump connected to a water supply to supply water to said tank, said control comprising:
    a tank adapter mounted directly on said water tank,
    a first pressure limit switch mounted on said manifold to detect a low and high air pressure threshold in said tank,
    a second pressure limit switch mounted on said manifold to detect a low air pressure threshold in said tank,
    a first water level electrode for detecting a high water level threshold in said tank,
    a first circuit means for energizing said water pump in response to said first pressure limit switch detecting a low air pressure threshold and deenergizing said water pump when said first pressure limit switch detects a high air pressure threshold in said tank,
    a second circuit means for energizing said water pump in response to said second pressure limit switch detecting a low air pressure threshold in said tank and deenergizing said pump in response to said first water level electrode detecting a high water level threshold in said tank,
    means to connect the first or second circuit means in said control exclusively to select the mode in which the water pump is controlled,
    a third pressure limit switch located in said tank adapter to detect when the air pressure in said tank exceeds a dangerous pressure level threshold, and
    a third circuit means for deenergizing said first and second circuit means responsive to the third pressure limit switch detecting a dangerous pressure level in said tank.

2. A hydropneumatic tank control as defined in claim 1 including means to disable said first and second circuit means if said third pressure limit switch is inoperative.

3. A hydropneumatic tank control as defined in claim 1 including a fourth pressure limit switch connected to detect the oil pressure threshold in said air compressor and means to disable said first and second circuit means if said oil pressure threshold is not detected.

4. An air volume control for a water system comprising,
    a closed tank having a water inlet and outlet and an air inlet manifold;
    a water supply for supplying water under pressure through said water inlet,
    a water level detector for detecting when the water level in said tank is above a predetermined water level,
    a tank air pressure switch for detecting when the air pressure in said tank is below a predetermined pressure level,
    an air compressor connected for supplying pressured air to said tank,
    means for energizing said air compressor when the water level is above a predetermined level and the air pressure is below a predetermined level,
    a weatherproof enclosure surrounding said air compressor,
    a temperature sensor in said enclosure for detecting the temperature therein,
    a blower in said enclosure for blowing cooling air over said compressor, circuit means controlled by said temperature sensor for preventing said air compressor and blower from operating if the enclosure temperature is above a predetermined first temperature level and for preventing said air compressor only from operating if said enclosure temperature is above a predetermined second temperature level that is below said first predetermined temperature level.

5. An air volume control as defined in claim 4 wherein said circuit means causes said blower to operate after said air compressor is deenergized until said enclosure temperature reaches a third predetermined temperature level.

6. An air volume control as defined in claim 4 wherein said enclosure has a cooling air inlet and outlet in a bottom baffle only and includes a second baffle for preventing the flow of cooling air passing through said outlet from around said compressor and to enter said inlet.

* * * * *